United States Patent
Roy et al.

(10) Patent No.: US 7,369,616 B2
(45) Date of Patent: May 6, 2008

(54) SIMULTANEOUS MULTI-BAND TRANSMISSION ON A PRINTED CIRCUIT BOARD

(75) Inventors: Aninda K. Roy, San Jose, CA (US); Claude R. Gauthier, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 792 days.

(21) Appl. No.: 10/373,364

(22) Filed: Feb. 24, 2003

(65) Prior Publication Data

US 2004/0165670 A1    Aug. 26, 2004

(51) Int. Cl.
  *H04L 27/00*   (2006.01)
(52) U.S. Cl. ..................................... 375/259
(58) Field of Classification Search ............ 375/140–4, 375/147–8, 150–152, 219–20, 260, 299, 375/343, 347, 349, 267, 259; 370/344, 430; 455/73, 88; 340/538.15, 310.16
See application file for complete search history.

(56) References Cited

U.S. PATENT DOCUMENTS

| | | | |
|---|---|---|---|
| 6,449,262 B1* | 9/2002 | Hwang et al. | 375/222 |
| 6,611,565 B1* | 8/2003 | Bada et al. | 375/295 |
| 6,690,717 B1* | 2/2004 | Kim et al. | 375/222 |
| 6,741,551 B1* | 5/2004 | Cherubini | 375/260 |
| 6,882,680 B1* | 4/2005 | Oleynik | 375/147 |
| 2003/0035491 A1* | 2/2003 | Walton et al. | 375/267 |
| 2003/0072382 A1* | 4/2003 | Raleigh et al. | 375/267 |
| 2004/0106381 A1* | 6/2004 | Tiller | 455/73 |
| 2004/0170226 A1* | 9/2004 | Agazzi | 375/260 |
| 2005/0156322 A1* | 7/2005 | Smith et al. | 257/778 |

* cited by examiner

*Primary Examiner*—Khai Tran
(74) *Attorney, Agent, or Firm*—Osha Liang LLP (57) ABSTRACT

The present invention is an apparatus and method for increasing the amount of data on a transmission path on a printed circuit board. Conventional methods allow only one data signal to be transmitted on the transmission path. The present invention uses multiple transmitters to modulate multiple data signals to form multiple modulated signals. The modulated signals are transmitted, possibly simultaneously, on the transmission path to receivers configured to demodulate individual modulated signals and recover the original data signals.

20 Claims, 6 Drawing Sheets

SIMULTANEOUS MULTI-BAND TRANSMISSION ON A PRINTED CIRCUIT BOARD

BACKGROUND OF INVENTION

Figure 1:
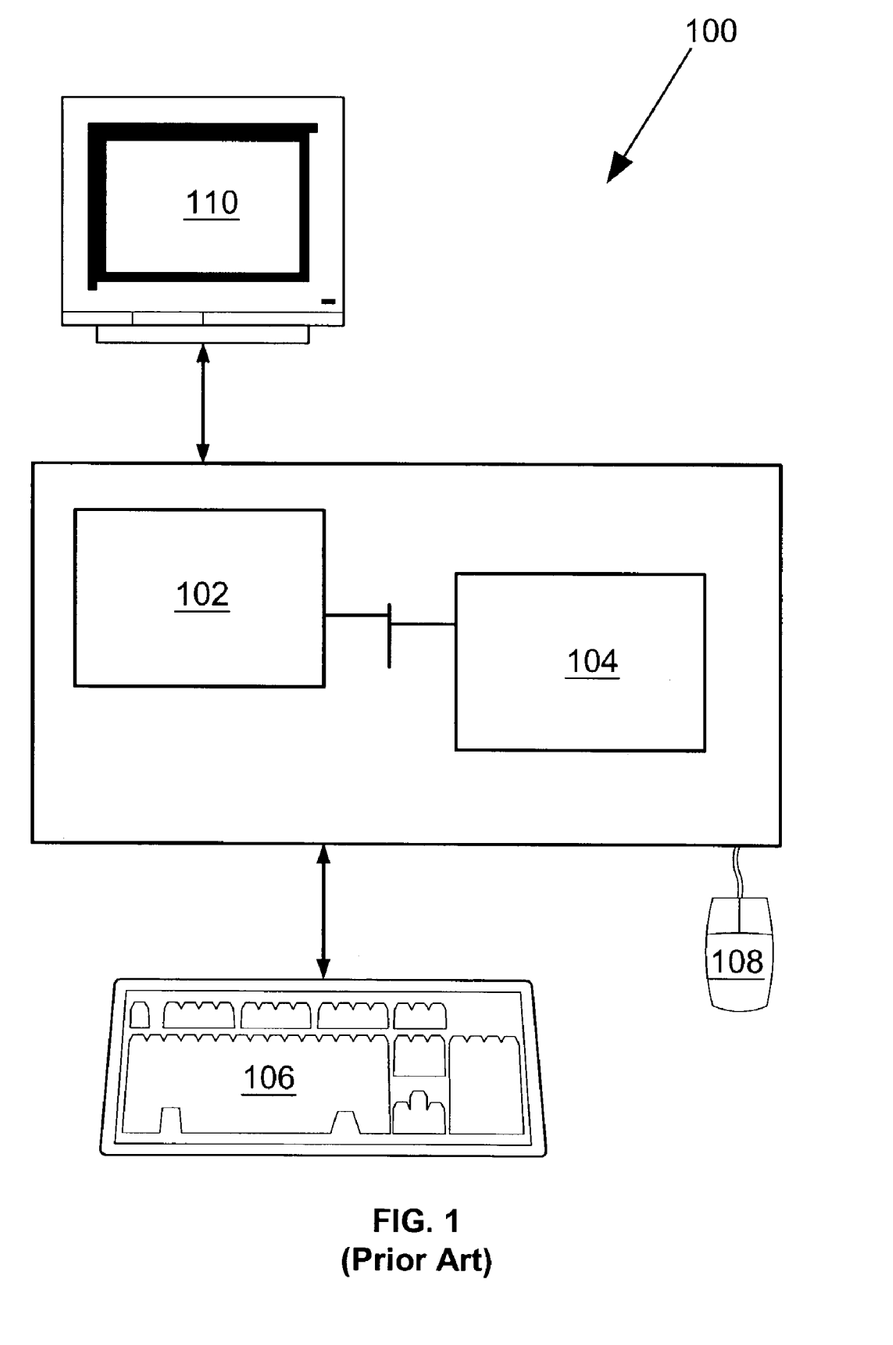
FIG. 1 shows a prior art block diagram of a computer system.

As shown in FIG. 1, a common computer system (100) includes a central processing unit (CPU) (102), memory (104), and numerous other elements and functionalities typical of today's computers (not shown). The computer (100) may also include input means, such as a keyboard (106), a mouse (108), and an output device, such as a monitor (110). Those skilled in the art will understand that these input and output means may take other forms in an accessible environment. In one or more embodiments of the invention, the computer system may have multiple processors and may be configured to handle multiple tasks.

The CPU (102) is an integrated circuit (IC) and is one of many integrated circuits included in the computer (100). Integrated circuits may perform operations on data and transmit resulting data to other integrated circuits. The performance of the computer depends heavily on the speed and efficiency with which data is transmitted between integrated circuits.

Figure 2:
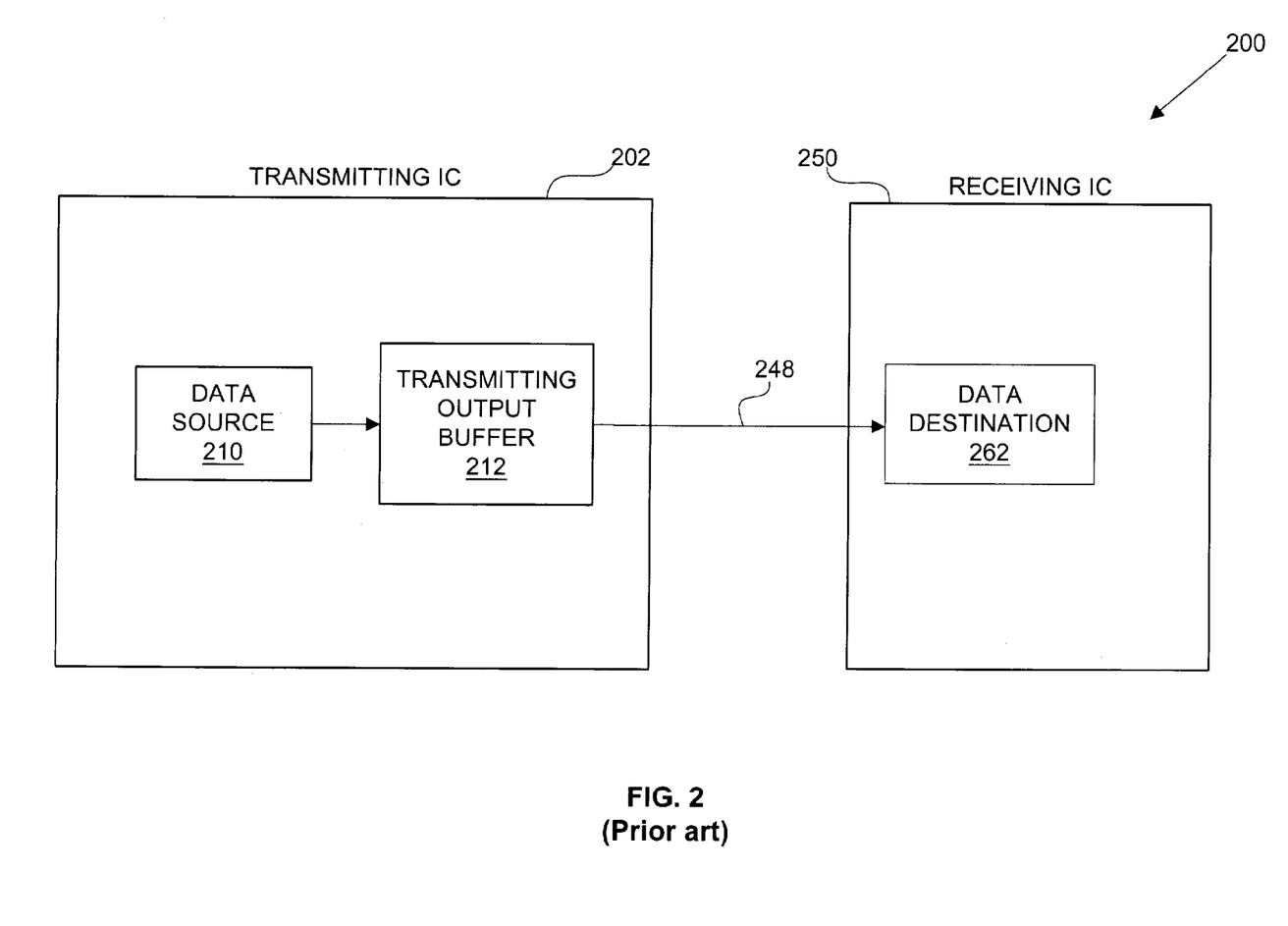
FIG. 2 shows a block diagram of a prior art scheme for data transmission between two integrated circuits.

FIG. 2 shows a block diagram of a prior art system (200) for transmitting data from a transmitting IC (202) to a receiving IC (250) using a transmission path (248). A data source (210) represents computing elements of the transmitting IC (202). The data source (210) may produce data for the transmitting IC (202) to transmit to the receiving IC (250). Data to be transmitted is sent by the data source (210) to the transmitting output buffer (212) to be put onto the transmission path (248). The transmission path (248) propagates the data signal to the receiving IC (250) where the data signal is received at the data destination (262), which represents the receiving IC's (250) input buffer and computing elements.

The rate of data transmission on the transmission path (248) between the transmitting IC (202) and the receiving IC (250) on a printed circuit board (PCB) is limited by a bandwidth of the transmission path (248). However, the rate at which data can be put onto the transmission path (248) is limited by the speed at which output buffer (212) on the transmitting IC (202) can operate. Using current technologies, the rate at which data can be put onto the transmission path (248) may be substantially lower than the rate at which the transmission path (248) may transmit.

If the output buffer (212) is incapable of using the entire bandwidth of the transmission path (248), then part of the bandwidth of the transmission path (248) is wasted. In order to transmit more data, more transmission paths (like 248) must be used. Additional transmission paths result in increased cost of materials and increased design complexity. Each of the added transmission paths must also use a package pin to drive the data signals on those transmission paths, increasing complexity and cost still more.

Printed circuit boards are commonly constructed from a glass fiber epoxy laminate called FR4. Transmission paths are traces of metal on the PCB. The traces of metal form wires along which electrical signals may be propagated. The traces of metal are commonly constructed from copper. One of ordinary skill in the art will understand that materials other than FR4 may be used for the PCB and that materials other than copper may be used for the metal traces. Properties of the metal traces and of the PCB material determine the bandwidth of the transmission path formed by the metal traces on the PCB. A significant property of the metal traces is resistivity, which, along with geometry, determines the resistance of the traces. A significant property of the PCB material is the dielectric constant, which, along with geometry, determines the capacitance between metal traces.

A PCB may connect to another PCB through a PCB connector. A PCB connector may include multiple conductive elements to connect multiple metal traces on a first PCB to multiple metal traces on a second PCB. A transmission path may traverse a metal trace on a first PCB, a PCB connector, and a metal trace on a second PCB.

SUMMARY OF INVENTION

According to an embodiment of the present invention, a computer system having a printed circuit board comprises a transmission path disposed on the printed circuit board; a first transmitter, disposed on the printed circuit board, arranged to output a first modulated signal; a second transmitter, disposed on the printed circuit board, arranged to output a second modulated signal on the transmission path, where a modulated transmission on the transmission path comprises the first modulated signal and the second modulated signal; a first receiver, disposed on the printed circuit board, arranged to receive the modulated transmission; and a second receiver, disposed on the printed circuit board, arranged to receive the modulated transmission.

According to an embodiment of the present invention, a method for transmitting on a transmission path on a printed circuit board comprises generating a first modulated signal using a first carrier frequency, where the first carrier frequency is within a first frequency band of a plurality of frequency bands; generating a second modulated signal using a second carrier frequency, where the second carrier frequency is within a second frequency band of the plurality of frequency bands; transmitting a modulated transmission on the transmission path on the printed circuit board, where the modulated transmission comprises the first modulated signal and the second modulated signal; and receiving the modulated transmission.

According to an embodiment of the present invention, an apparatus comprises means for generating a first modulated signal using a first carrier frequency, where the first carrier frequency is within a first frequency band of a plurality of frequency bands; means for generating a second modulated signal using a second carrier frequency, where the second carrier frequency is within a second frequency band of the plurality of frequency; means for transmitting a modulated transmission on the a transmission path on a printed circuit board, where the modulated transmission comprises the first modulated signal and the second modulated signal; and means for receiving the modulated transmission.

DETAILED DESCRIPTION

A transmission path on a PCB is capable of handling more data than conventional transmitters can provide. A technique to allow multiple transmitters to transmit on the same transmission path may increase the amount of data on the transmission path. Embodiments of the present invention relate to a means for increasing data transmitted on a transmission path using modulation techniques to allow multiple data signals to be propagated on the transmission path simultaneously.

Figure 3:
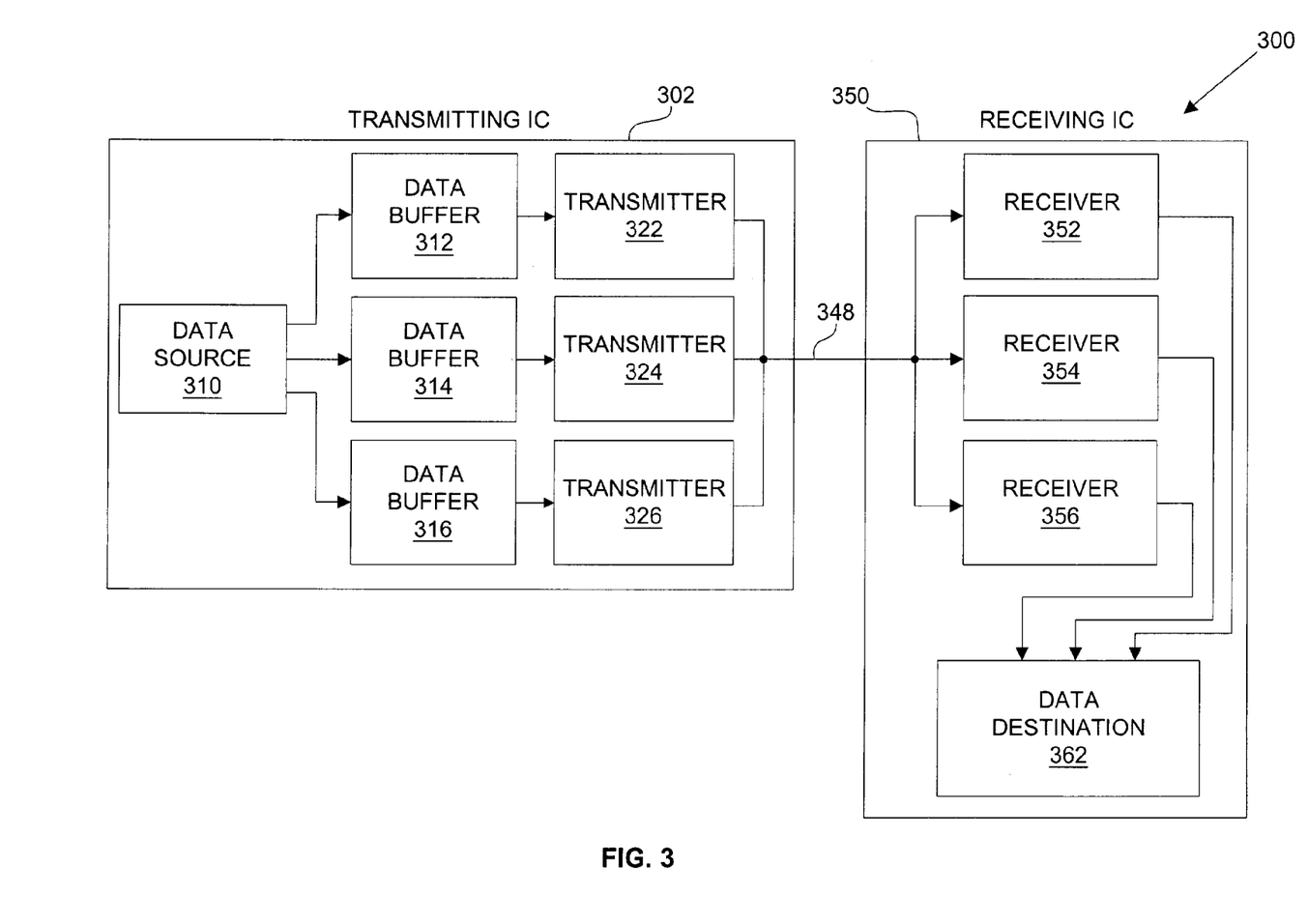
FIG. 3 shows a block diagram of a scheme for data transmission between two integrated circuits in accordance with an embodiment of the present invention.

FIG. 3 shows an exemplary block diagram of a multiple band transmission system (300) in accordance with an embodiment of the present invention. In FIG. 3, a data source (310) represents the computing elements of a transmitting IC (302). The data source (310) produces data for the transmitting IC (302) to transmit to a receiving IC (350). Rather than sending data to be transmitted to a transmitting output buffer (212 shown in FIG. 2), the data is split up into multiple data signals and sent to multiple data buffers (312, 314, 316). The splitting of the data into separate data signals may take multiple forms. The data source (310) comprises elements that handle this splitting.

The data source (310) may comprise multiple elements, each with data to be transmitted to the receiving IC (350). The multiple elements may be coupled to individual data buffers (312, 314, 316). Alternatively, the computing elements comprising the data source (310) may produce a single data signal. The single data signal may be split into multiple parallel data signals at lower speeds than the single data signal. Each of the parallel data signals may be coupled to individual data buffers (312, 314, 316).

Each transmitter (322, 324, 326) comprises a modulator. The modulator modulates the data signal forwarded from the data buffers (312, 314, 316) so that an appropriately configured demodulator may recover the data signal from a transmission path (348) carrying other data signals. Each transmitter (322, 324, 326) may modulate the signal received from the corresponding data buffer (312, 314, 316) such that the modulated signal produced by the transmitter (e.g., 322) does not interfere with the modulated signals produced by the other transmitters (e.g., 324, 326).

Each of the modulated signals are put onto the same transmission path (348). A modulated transmission comprises the sum of all the modulated signals. The modulated transmission is carried by the transmission path (348). The modulated transmission is fed in parallel to a plurality of receivers (352, 354, 356) on the receiving IC (350). Each of the plurality of receivers (352, 354, 356) includes a demodulator. Each demodulator is configured to demodulate at least one of the modulated signals produced by the transmitters (312, 314, 316). Each demodulated output of the receivers (352, 354, 356) corresponds to one of the data signals produced by the data source (310). The demodulated outputs of the receivers (352, 354, 356) are then fed to a data destination (362). The data destination (362) is representative of the receiving IC's (350) computing elements.

One of ordinary skill in the art will understand that with a modulating transmission scheme, multiple integrated circuits may transmit and receive on the same transmission path.

Figure 4:
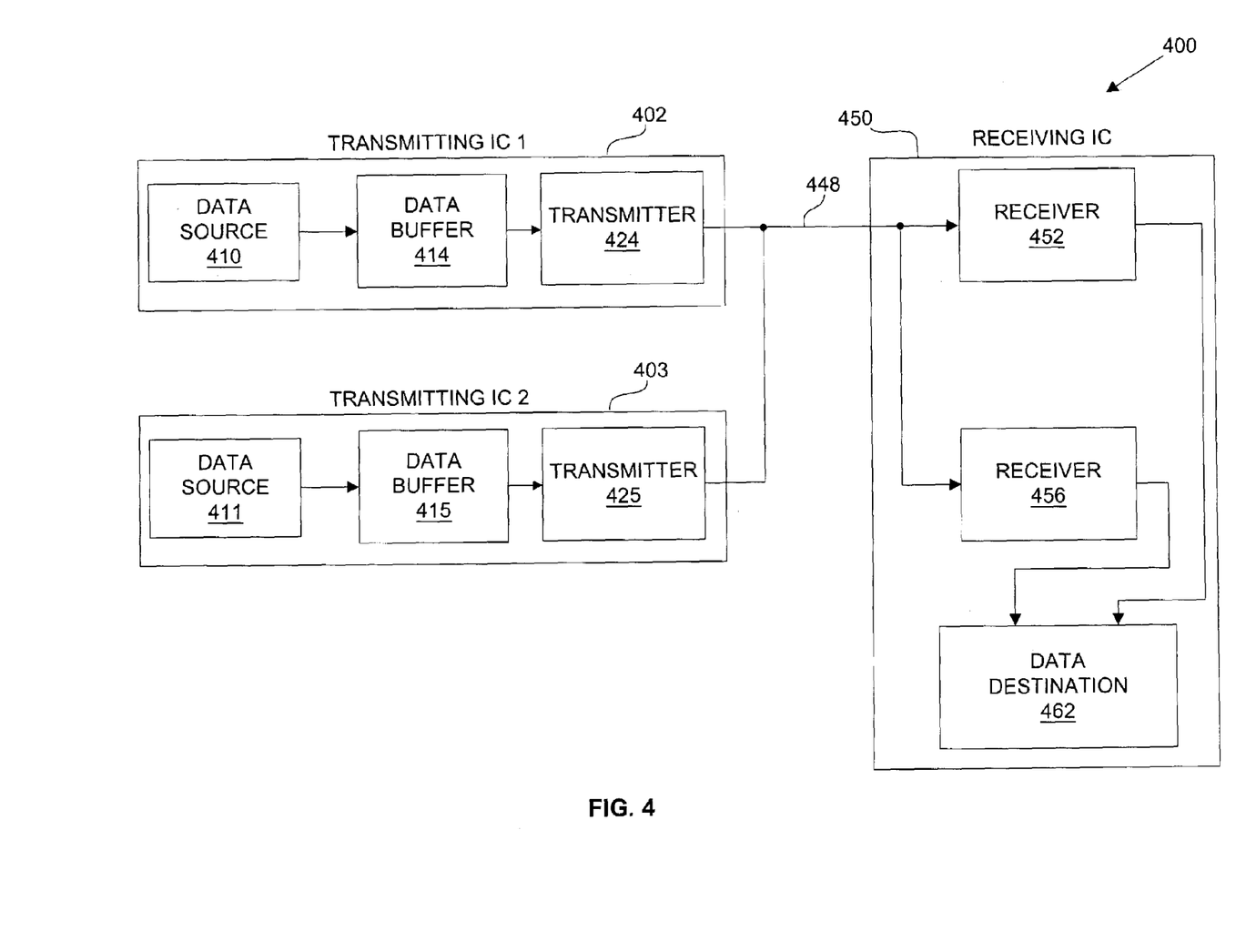
FIG. 4 shows a block diagram of a scheme for data transmission between two integrated circuits in accordance with an embodiment of the present invention.

FIG. 4 shows an exemplary block diagram of communication system (400) with multiple transmitting integrated circuits (402, 403). Transmitting IC (402) includes data source (410), data buffer (414), and transmitter (424). Transmitting IC (403) includes data source (411), data buffer (415), and transmitter (425). The data source (410), data buffer (414), and transmitter (424) operate similarly to the data source (310), data buffer (312), and transmitter (322) shown in FIG. 3. With properly configured modulators inside transmitters (424, 425), transmitting IC (402) and transmitting IC (403) may transmit simultaneously on transmission path (448). Inside the receiving IC (450), receivers (452, 456) demodulate the modulated signals transmitted by the transmitting integrated circuits (402, 403) to generate demodulated data signals. The demodulated data signals are forwarded to the data destination (462), which represents the computing elements of the receiving IC (450).

One of ordinary skill in the art will understand that there are a large number of possible permutations of configurations of multiple modulating transmitters and multiple demodulating receivers using a single transmission line. FIGS. 3 and 4 are examples of only two potential configurations in accordance with embodiments of the present invention.

In one or more embodiments of the present invention, amplitude modulation may be used to modulate data signals for transmission on a transmission pathway. In an amplitude modulation system, total bandwidth of a transmission path is divided into frequency bands. Each frequency band is used to transmit one modulated signal. In one or more embodiments, each modulated signal has a bandwidth equal to or less than the bandwidth of the frequency band in which the modulated signal is transmitted. In one or more embodiments, the frequency band used by a modulated signal is determined by a carrier frequency. The carrier frequency may be equal to a center frequency of the frequency band.

Figure 5:
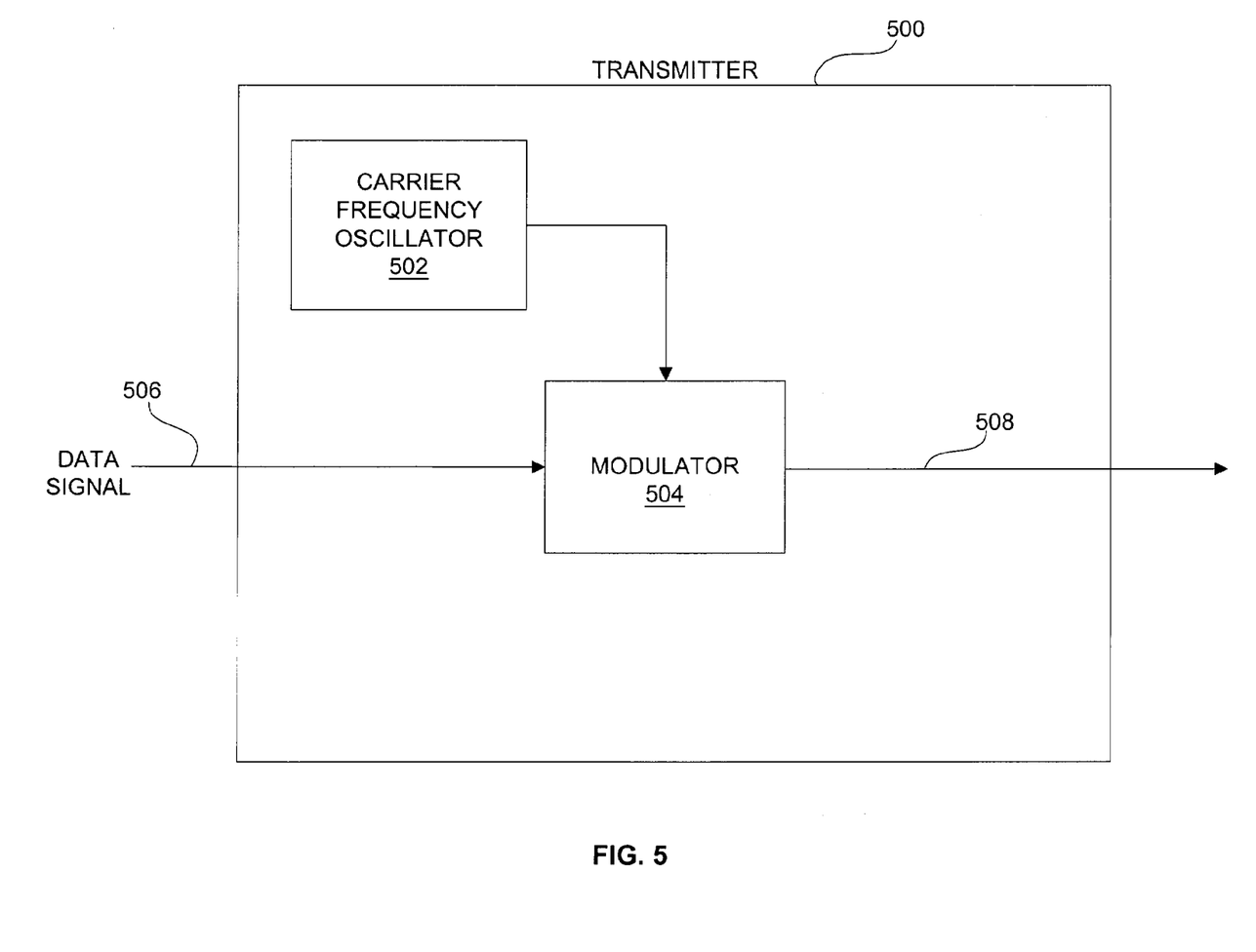
FIG. 5 shows a block diagram of a transmitter in accordance with an embodiment of the present invention.

FIG. 5 shows an exemplary embodiment of a transmitter (500) used for modulating a data signal. The transmitter (500) is similar to the transmitters in FIGS. 3 and 4, for example, transmitter (322) shown in FIG. 3. The transmitter (500) uses an amplitude modulation scheme and includes a carrier frequency oscillator (502) and a modulator (504). A data signal is carried to the modulator (504) on line (506). An output of the carrier frequency oscillator (502) is a carrier signal oscillating at the carrier frequency. The carrier signal is input to the modulator (504). The modulator (504) is a non-linear circuit that outputs a modulated signal on line (508). The modulated signal oscillates at the carrier frequency and the data signal is represented by a varying amplitude of the modulated signal.

Figure 6:
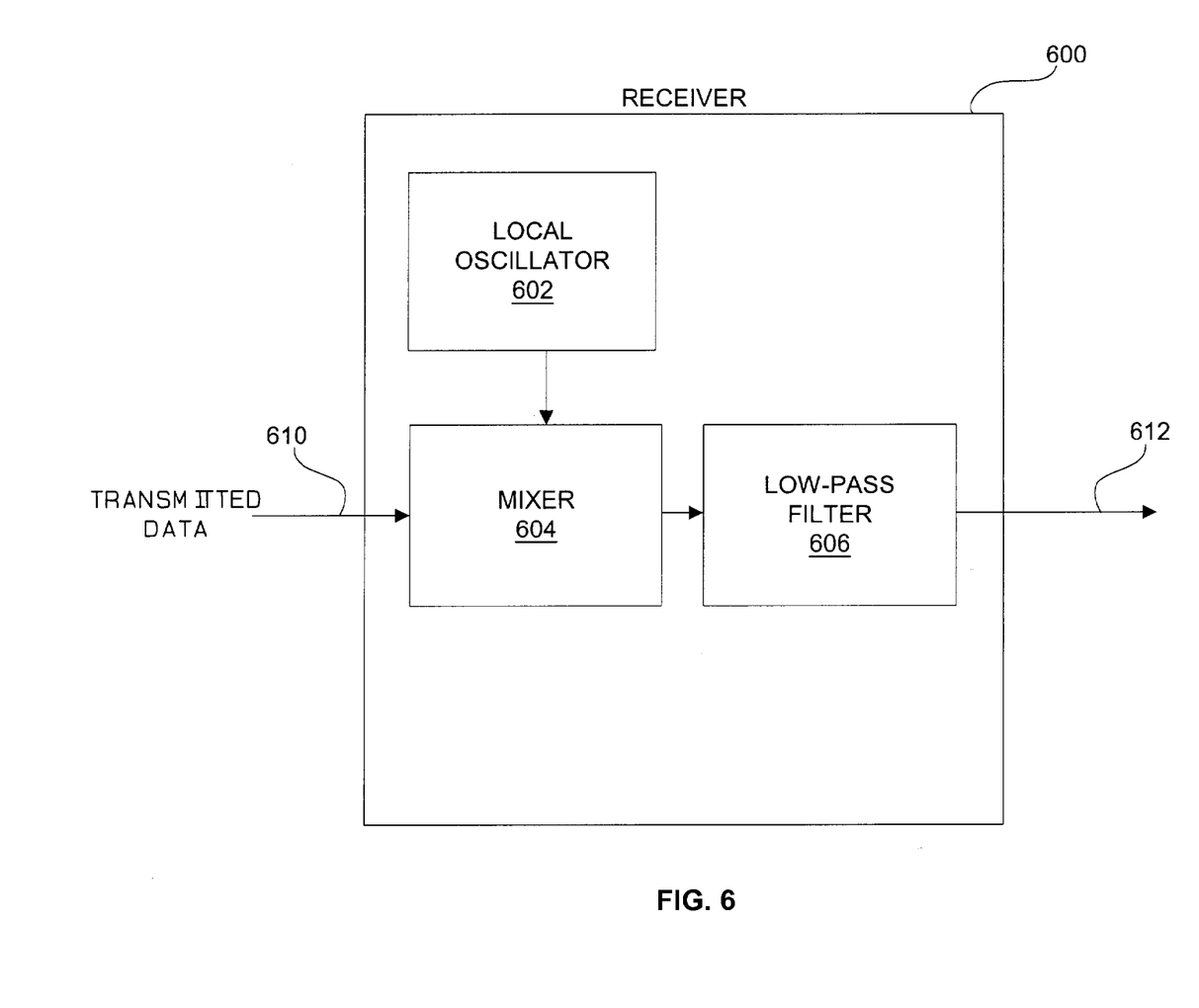
FIG. 6 shows a block diagram of a receiver in accordance with an embodiment of the present invention.

FIG. 6 shows an exemplary embodiment of a receiver (600) used for demodulating signals modulated by a transmitter (e.g. transmitter (500) shown in FIG. 5). The receiver (600) is similar to the receivers in FIGS. 3 and 4, for example, receiver (352) shown in FIG. 3. The receiver (600) includes a local oscillator (602), a mixer (604), and a low-pass filter (606). A modulated transmission is input to the mixer (604) on line (610). An output of the local oscillator (602) is a local oscillator signal oscillating at the local oscillating frequency. In one or more embodiments, the local oscillator frequency is similar to a carrier frequency used to modulate the data signal.

The local oscillator signal is input to the mixer (604). The mixer (604) is a non-linear circuit that produces a mixer output signal that includes intermodulation frequencies and harmonic frequencies of the carrier frequency and the local oscillator frequency. One of the intermodulation frequencies produced is equal to the difference between the carrier frequency and the local oscillator frequency. If the carrier frequency and the local oscillator frequency closely match one another, the difference between them is approximately zero. Therefore, a low-pass filter (606) may be applied to the mixer output signal to filter other (non-zero) intermodulation and harmonic frequencies. The output of the low-pass filter (606) is a demodulated data signal and may be similar to a data signal originally input to a transmitter.

One of ordinary skill in the art will understand that other modulation and demodulation schemes may be used in the present invention. A more complex scheme of AM modulation includes using a local oscillator frequency that is substantially different than the carrier frequency. An output of a mixer using the more complex scheme is an amplitude modulated signal at an intermediate frequency. The amplitude modulated signal is then demodulated from the intermediate frequency. In one or more embodiments, a demodulation scheme using an intermediate frequency may decrease the complexity of a receiver. Other modulation/demodulation schemes that may be used include, but are not limited to: frequency modulation, time division multiple access, code division multiple access, and quadrature amplitude modulation.

Advantages of the present invention may include one or more of the following. In one or more embodiments, the present invention may increase the amount of data on a transmission path. In one or more embodiments, the present invention may decrease the cost of PCB manufacture by decreasing the number of traces on the PCB. In one or more embodiments, the present invention may decrease the cost of PCB manufacture by decreasing the complexity of routing signals on the PCB. In one or more embodiments, the present invention may decrease the time required to design a PCB by decreasing the complexity of routing signals on the PCB.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
    a transmission path provided for transmitting data in the computer system;
    at least one printed circuit board for mounting at least one transmitting integrated circuit and at least one receiving integrated circuit and for forming the transmission path, wherein the at least one transmitting integrated circuit comprises at least one transmitter, and the at least one receiving integrated circuit comprises at least one receiver;
    a first transmitter, disposed on the at least one printed circuit board, arranged to output a first modulated signal communicating data;
    a second transmitter, disposed on the at least one printed circuit board, arranged to output a second modulated signal communicating data on the transmission path, wherein a modulated transmission on the transmission path comprises the first modulated signal and the second modulated signal;
    a first receiver, disposed on the at least one printed circuit board, arranged to receive the modulated transmission; and
    a second receiver, disposed on the at least one printed circuit board, arranged to receive the modulated transmission, wherein the first and second receiver receive the modulated transmission for data communications,
    wherein the transmission path formed on the at least one printed circuit board connects the first and the second transmitter to the first and the second receiver without being branched directly to an antenna or a cable line for transmitting data.

2. The computer system of claim 1, wherein the first transmitter outputs the first modulated signal in a first frequency band, and wherein the second transmitter outputs the second modulated signal in a second frequency band.

3. The computer system of claim 1, wherein the at least one printed circuit board comprises a first printed circuit board and a second printed circuit board connected by a printed circuit board connector.

4. The computer system of claim 1, wherein the at least one printed circuit board is constructed of FR4.

5. The computer system of claim 1, wherein the first transmitter and the second transmitter are on a same integrated circuit.

6. The computer system of claim 1, wherein the first receiver and the second receiver are on a same integrated circuit.

7. The computer system of claim 1, wherein the first transmitter comprises:
    a carrier frequency oscillator, wherein the carrier frequency oscillator is arranged to output a carrier signal at a carrier frequency; and
    a modulator, wherein the modulator is arranged to receive an input data signal and the carrier signal, and wherein the modulator is arranged to modulate the input data signal to the carrier frequency.

8. The computer system of claim 1, wherein the first receiver comprises:
    a local oscillator arranged to output a local oscillator signal at a local oscillator frequency;
    a mixer arranged to receive the local oscillator signal and the modulated transmission, wherein the mixer is arranged to output a mixer output signal comprising a demodulated data signal and high-frequency components; and
    a low-pass filter arranged to filter the high frequency components from the mixer output signal and output the demodulated data signal.

9. The computer system of claim 1, wherein there are an equal number of transmitters, frequency bands, and receivers.

10. A method for transmitting data in a computer system with at least one printed circuit board for mounting at least one transmitting integrated circuit and at least one receiving integrated circuit and for forming a transmission path, wherein the at least one transmitting integrated circuit comprises at least two transmitters, and the at least one receiving integrated circuit comprises at least two receivers, the method comprising:
    disposing the transmission path on the at least one printed circuit board for transmitting data in the computer system;
    generating a first modulated signal using a first carrier frequency, wherein the first carrier frequency is within a first frequency band of a plurality of frequency bands;
    generating a second modulated signal using a second carrier frequency, wherein the second carrier frequency is within a second frequency band of the plurality of frequency bands;
    transmitting a modulated transmission communicating data on the at least one transmission path, wherein the modulated transmission comprises the first modulated signal and the second modulated signal; and receiving the modulated transmission for data communication, wherein the transmission path formed on the at least one printed circuit board connects the at least two transmitters to the at least two receivers without being branched directly to an antenna or a cable line for transmitting data.

11. The method of claim 10, further comprising:
modulating a first data signal; and
modulating a second data signal.

12. The method of claim 11, wherein the modulating the first data signal and the modulating the second data signal occur on a same integrated circuit.

13. The method of claim 11, wherein the modulating the first data signal comprises:
producing a carrier signal at the first carrier frequency;
inputting a data signal and the carrier signal; and
modulating the data signal to the first carrier frequency.

14. The method of claim 10, further comprising:
demodulating the first modulated signal; and
demodulating the second modulated signal.

15. The method of claim 14, wherein the demodulating the first modulated signal and the demodulating the second modulated signal occur on a same integrated circuit.

16. The method of claim 14, wherein the demodulating the first modulated signal comprises:
outputting a local oscillator signal at a local oscillator frequency;
receiving the local oscillator signal and the modulated transmission;
outputting a mixer output signal comprising a demodulated data signal and high-frequency components; and
low-pass filtering the mixer output signal.

17. The method of claim 10, wherein the printed circuit board comprises a first printed circuit board and a second printed circuit board connected by a printed circuit board connector.

18. The method of claim 10, further comprising:
modulating at least one data signal; and
demodulating at least one modulated signal, wherein the demodulating uses n demodulators;
wherein the modulating uses n frequency bands;
wherein the modulating uses n modulators;
wherein the transmitting uses n transmitters; and
wherein the receiving uses n receivers.

19. An apparatus, comprising:
a transmission path provided for transmitting data in a computer system;
at least one printed circuit board for mounting at least one transmitting integrated circuit and at least one receiving integrated circuit and for forming the transmission path, wherein the at least one transmitting integrated circuit comprises at least one transmitter, and the at least one receiving integrated circuit comprises at least one receiver;
means for generating a first modulated signal using a first carrier frequency, wherein the first carrier frequency is within a first frequency band of a plurality of frequency bands;
means for generating a second modulated signal using a second carrier frequency, wherein the second carrier frequency is within a second frequency band of the plurality of frequency bands;
means for transmitting a modulated transmission communicating data on the transmission path, wherein the modulated transmission comprises the first modulated signal and the second modulated signal; and
means for receiving the modulated transmission,
wherein the transmission path formed on the at least one printed circuit board connects the means for transmitting the modulated transmission communicating data to the means for receiving the modulated transmission without being branched directly to an antenna or a cable line.

20. The apparatus of claim 19, further comprising:
means for modulating a first data signal to form a first modulated signal;
means for modulating a second data signal to form a second modulated signal;
means for demodulating the first modulated signal; and
means for demodulating the second modulated signal.

* * * * *